United States Patent
Sadot et al.

(10) Patent No.: US 7,970,876 B2
(45) Date of Patent: Jun. 28, 2011

(54) GLOBAL SERVER LOAD BALANCER

(75) Inventors: Emek Sadot, Givatayim (IL); Itai Ephraim Zilbershtein, Petach-Tikva (IL)

(73) Assignee: Avaya Communication Israel Ltd., Tel Aviv (IL)

( * ) Notice: Subject to any disclaimer, the term of this patent is extended or adjusted under 35 U.S.C. 154(b) by 2062 days.

(21) Appl. No.: 10/201,147

(22) Filed: Jul. 23, 2002

(65) Prior Publication Data
US 2004/0019659 A1    Jan. 29, 2004

(51) Int. Cl.
G06F 15/16    (2006.01)
G06F 15/173    (2006.01)

(52) U.S. Cl. ........ 709/223; 709/203; 709/217; 709/219; 709/226; 709/227; 709/245

(58) Field of Classification Search .................... 709/219
See application file for complete search history.

(56) References Cited

U.S. PATENT DOCUMENTS

| | | | |
|---|---|---|---|
| 6,173,322 B1 * | 1/2001 | Hu | 709/226 |
| 6,249,801 B1 * | 6/2001 | Zisapel et al. | 718/105 |
| 6,282,569 B1 * | 8/2001 | Wallis et al. | 709/224 |
| 6,629,148 B1 * | 9/2003 | Ahmed et al. | 709/239 |
| 6,671,259 B1 * | 12/2003 | He et al. | 370/238 |
| 6,775,692 B1 * | 8/2004 | Albert et al. | 709/239 |
| 6,920,498 B1 * | 7/2005 | Gourlay et al. | 709/227 |
| 6,990,616 B1 * | 1/2006 | Botton-Dascal et al. | 709/238 |
| 2001/0052016 A1 * | 12/2001 | Skene et al. | 709/226 |
| 2002/0038360 A1 * | 3/2002 | Andrews et al. | 709/223 |
| 2002/0071391 A1 * | 6/2002 | Ishioka | 370/238 |
| 2002/0078237 A1 * | 6/2002 | Leighton et al. | 709/239 |
| 2002/0120743 A1 * | 8/2002 | Shabtay et al. | 709/226 |
| 2002/0133575 A1 * | 9/2002 | Cidon et al. | 709/220 |
| 2002/0141378 A1 * | 10/2002 | Bays et al. | 370/351 |

FOREIGN PATENT DOCUMENTS

EP    0 959 601 A1    11/1999

OTHER PUBLICATIONS

J.D. Guyton et al., "Locating Nearby Copies of Replicated Internet Servers," Computer Science Department, pp. 288-298, 1995.

(Continued)

*Primary Examiner* — Hassan Phillips
(74) *Attorney, Agent, or Firm* — Joseph B. Ryan; Jason Paul DeMont; Wayne S. Breyer

(57) ABSTRACT

A method of selecting, by a global server load balancer (GSLB), a server to represent a virtual server hosted by a plurality of servers. The method includes receiving, by the GSLB, values of one or more communication parameters of paths between at least one test unit and at least two servers from the plurality of servers, receiving, by the GSLB, a request to establish a connection with the virtual server from a client, selecting a test unit from the at least one test unit to represent the client, and selecting one of the plurality of servers to represent the virtual server before the client, responsive to the values of the one or more parameters for paths between the selected test unit and the at least two servers of the selected test units.

18 Claims, 2 Drawing Sheets

OTHER PUBLICATIONS

Stewart, J. N. for New Architect; "Content Delivery for Distributed Sites;" Oct. 30, 2001; pp. 1-5; Retrieved from: <www.webtechniques.com/archives/2000/12/conn>.

"Overview of the Cisco DistributedDirector2500 Series;" Oct. 30, 2001; pp. 1-8; Retrieved from: <www.cisco.com/univercd/cc/td/doc/product/iaabu/distdir/dd2501/ovr.htm>.

Hassan Bayaa, "CA Application No. 2,425,042 Office Action Dec. 7, 2005", , Publisher: CIPO, Published in: CA.

"EP Application No. 03 253 969.4 Examination Report Nov. 3, 2004", , Publisher: EPO, Published in: Ep.

"EP Application No. 03 253 969.4 Examination Report Jan. 18, 2006", , Publisher: EPO, Published in: EP.

"EP Application No. 03 253 969.4 Examination Report Jun. 16, 2006", , Publisher: EPO, Published in: EP.

* cited by examiner

GLOBAL SERVER LOAD BALANCER

FIELD OF THE INVENTION

The present invention relates to data communication networks and in particular to load balancing of packets in data networks.

BACKGROUND OF THE INVENTION

Web sites hosted by web servers are commonly used to provide users with information and/or to receive input from users. In order to access a web site, a client computer generally transmits a connection establishment request carrying a destination address of the web site to the web server. The web server responds according to predetermined rules, referred to as protocols, so as to form a connection and provide the requested information.

Some widely used web sites are hosted by a plurality of web servers located at different locations, in order to provide fast communication to client computers located in different areas. Each web server generally has a separate IP address.

In some cases, the owner of a web site hosted by a plurality of web servers manages a global server load balancer (GSLB), which determines, for each client request, to which server the client request is to be forwarded. All client requests are initially transmitted to the GSLB, which forwards the packets to the selected servers. GSLBs are described, for example, in "Content Delivery for Distributed Sites", downloaded from /www.webtechniques.com/archives/2000/12/conn, on Oct. 30, 2001, the disclosure of which is incorporated herein by reference. Some global server load balancers (GSLBs) select the web server to service a client based on a location of the client approximated from the IP address of the client. Known GSLBs also periodically determine the load on the web servers and accordingly select a server to service the client.

The "Distributed Director 2500" series of Cisco, as described in white papers downloaded from /www.cisco-.com/univercd/cc/td/doc/product/iaabu/distdir/dd2501/ovr.htm, on Oct. 30, 2001, the disclosure of which documents is incorporated herein by reference, distributes Internet services among topologically dispersed servers. The distributed director queries routers near each of the servers for information on the route from the router to the client. Responsive to the queries from the distributed director, each of the routers determines one or more parameters of the path from the router to the client and provides the parameter values to the director. The distributed director collects the information from the routers and selects a server to handle the client accordingly. The use of the distributed director increases the response time to client requests, as the client must wait for the gathering of the data on the route between the routers and the client. Also, the queries from the routers may be blocked out by a firewall protecting the client.

In order to monitor the performance of web servers, there are service providers, such as Mercury.com, which perform communication tests to web servers from a plurality of test units dispersed throughout the Internet. The service provider generates reports on the performance of the web servers and provides the report to a system manager of the web servers. The system manager may use the reports to determine, for example, whether additional web servers are required and/or if there are communication failures that require repair.

SUMMARY OF THE INVENTION

An aspect of some embodiments of the present invention relates to a global server load balancer (GSLB), which directs clients to one of a plurality of web servers hosting a web site. The GSLB periodically, at regular or irregular periods, receives data on the communications between a plurality of geographical areas and some or all of the web servers. When a client request is received by the GSLB, the GSLB estimates in which geographical area the client is located. A server is then selected according to the most up to date previously received data on the communications between the servers and the estimated client geographical area. By using periodically generated communication data, the load balancing can overcome temporary bottlenecks in the links between the client area and the server closest thereto, by directing the client to a different server. Optionally, the periodically received data on the communications is received by the GSLB irrespective of whether a client request for which the data is required was received.

In some embodiments of the invention, an Internet diagnosis service provider manages a plurality of test units distributed throughout the Internet. According to the instructions of the web site manager, some or all of the test units periodically test the communications with each of the servers. The test units periodically transmit the communication test results to the GSLB.

In some embodiments of the invention, the Internet diagnosis service provider manages a central test unit that collects the test results from all the test units and provides the data together to the GSLB. Thus, the GSLB does not need to manage the communication with all the test units. Alternatively, the communication test results are transmitted separately from each test unit to the GSLB, and a central test unit other than the GSLB, which gathers the data, is not required.

In some embodiments of the invention, a proprietary layer 7 protocol is used to transmit communication data to the GSLB. Optionally, the protocol defines two-way communication, allowing the GSLB to respond to the information, for example, requesting fewer, more or different tests from more or different areas.

There is therefore provided in accordance with an embodiment of the present invention, a method of selecting, by a global server load balancer (GSLB), a server to represent a virtual server hosted by a plurality of servers, comprising receiving, by the GSLB, values of one or more communication parameters of paths between at least one test unit and at least two servers from the plurality of servers, receiving, by the GSLB, a request to establish a connection with the virtual server from a client, selecting a test unit from the at least one test unit to represent the client, and selecting one of the plurality of servers to represent the virtual server before the client, responsive to the values of the one or more parameters for paths between the selected test unit and the at least two servers of the selected test units.

Optionally, receiving values of the one or more parameters comprises receiving periodically, for example at least once an hour. Optionally, receiving values of the one or more parameters comprises receiving the values in packets transmitted from the test units.

Optionally, the method includes transmitting test packets from the at least one test unit to the at least two of the plurality of servers, and determining the values of the one or more parameters responsive to the test packets. In an exemplary embodiment of the present invention, the test packets comprise ping packets and/or data retrieval requests. Optionally, the one or more parameters comprise a round trip delay, a throughput and/or a jitter. Optionally, selecting a test unit comprises selecting a test unit closest to the client.

Optionally, selecting a test unit comprises selecting responsive to the IP address of the client. Optionally, selecting one of the plurality of servers comprises selecting a server with a best value of a function of the one or more parameters for the path between the selected test unit and the servers. Optionally, selecting one of the plurality of servers comprises choosing a score function to apply to the one or more parameters associated with the different servers and selecting the server with a best score for the chosen function. Optionally, choosing the score function comprises choosing responsive to the client identity. Alternatively or additionally, choosing the score function comprises choosing a function which depends substantially only on the one or more parameters. Further alternatively or additionally, choosing the score function comprises choosing a function which depends on at least one attribute not determined by the test units. Optionally, the at least one test unit comprises a plurality of test units.

Optionally, the values of the one or more communication parameters used in selecting one of the plurality of servers to represent the virtual server before the client are received before the request to establish a connection from the client.

There is further provided in accordance with an embodiment of the present invention, a global server load balancer (GSLB), comprising an input interface adapted to receive client requests and packets including values for one or more parameters of the communications paths between at least one test unit and a plurality of servers representing a virtual server serviced by the global server load balancer, and a server selection unit adapted to select, responsive to a client request received through the input interface, a test unit to represent the client, and to select a server to service the client responsive to the values of the one or more parameters of the paths between the selected test unit and the servers.

Possibly, the server selection unit is adapted to manage a table of values of the one or more parameters for at least a plurality of pairs of test units and servers. Optionally, the GSLB includes a table update unit adapted to update the table based on the packets including values for one or more parameters received by the input interface. Optionally, the table update unit comprises a software running on a general purpose processor.

Optionally, the server selection unit is adapted to manage a table which states for each test unit a respective server. Optionally, the server selection unit comprises a hardware unit adapted to select the server. Optionally, the server selection unit is implemented substantially only by a hardware unit.

There is further provided in accordance with an embodiment of the present invention, a communication test unit, comprising a transmission unit adapted to transmit test packets to web servers, a processing unit adapted to generate test results responsive to the transmission of the test packets; and an encapsulation unit adapted to package test results into one or more packets in accordance with a protocol for communication between the test unit and global server load balancers, wherein the transmission unit is adapted to transmit the one or more packets prepared by the encapsulation unit to one or more global server load balancers.

Possibly, the transmission unit is adapted to transmit packets prepared by the encapsulation unit at a rate of at least once every ten minutes to at least one global server load balancer. In some embodiments of the invention, the transmission unit is adapted to transmit packets prepared by the encapsulation unit at a rate of at least once a minute to at least one global server load balancer.

BRIEF DESCRIPTION OF FIGURES

Particular exemplary embodiments of the invention will be described with reference to the following description of embodiments in conjunction with the figures, wherein identical structures, elements or parts which appear in more than one figure are preferably labeled with a same or similar number in all the figures in which they appear, in which.

DETAILED DESCRIPTION OF EMBODIMENTS

Figure 1:
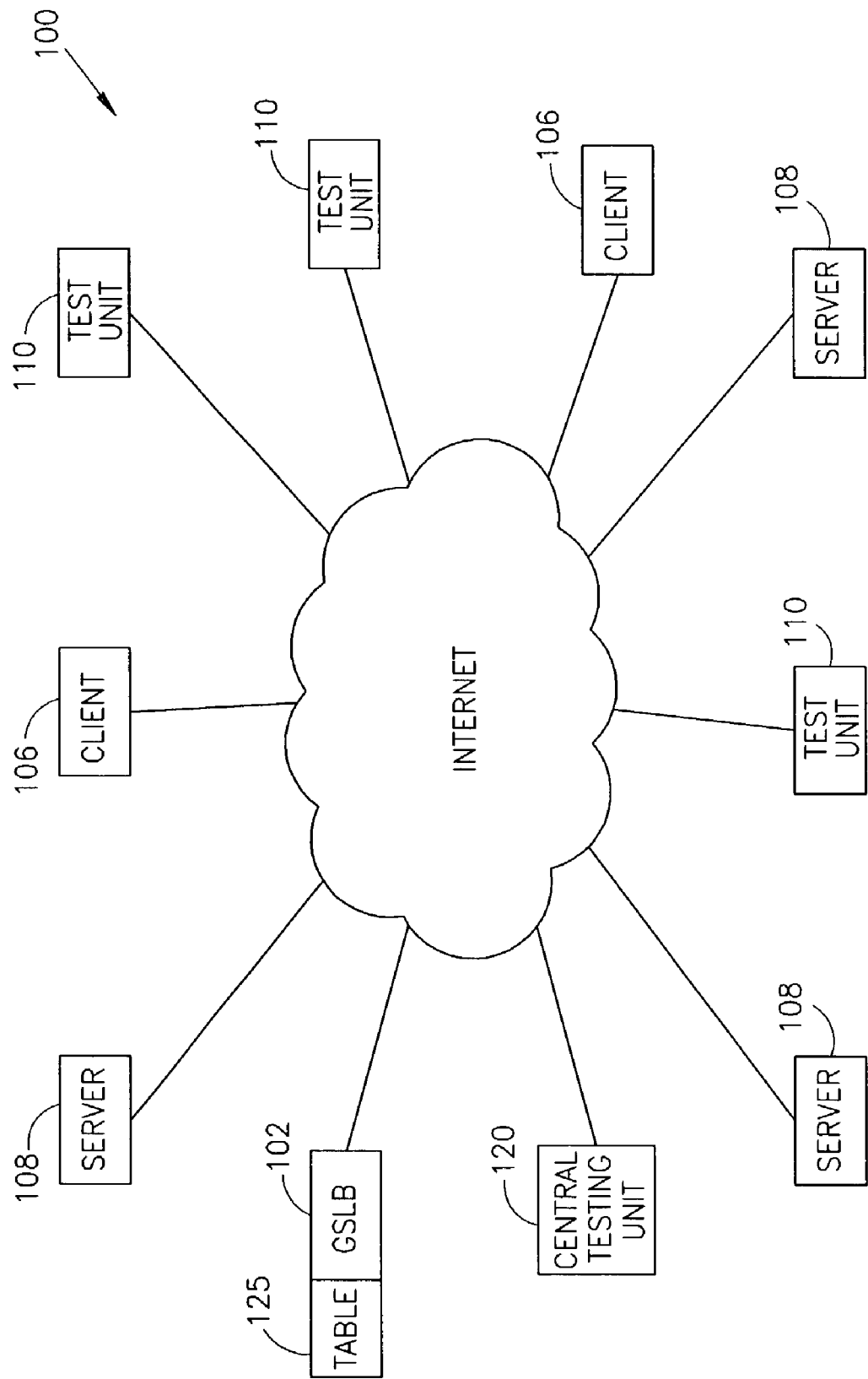
FIG. 1 is a schematic block diagram of a network in which a global server load balancer (GSLB) is used, in accordance with an embodiment of the present invention.

FIG. 1 is a schematic block diagram of a network 100 in which a global server load balancer (GSLB) 102 is used, in accordance with an embodiment of the present invention. Some web sites in network 100 are hosted by a plurality of servers 108 identified by different IP addresses, and optionally located in different geographical regions (e.g., in different metropolitan areas, states, countries or continents). Some of such web sites are serviced by a GSLB 102, which receives connection requests directed to the web site from clients 106, and selects a server 108 to represent the site to the client, as described hereinbelow.

Optionally, a plurality of test units 110, distributed throughout network 100, periodically transmit test packets to each of servers 108, and measure one or more parameters of the test packets, e.g., the response time to the test packets. Optionally, test units 110 transmit the measured values of the one or more parameters to GSLB 102. Alternatively or additionally, test units 110 transmit the measured values to a central testing unit 120, which in turn passes the measured values to GSLB 102, optionally after some processing.

In some embodiments of the invention, the test packets transmitted by test units 110 comprise ping packets or other similar packets, which only minimally utilize resources of servers 108. Alternatively or additionally, the test packets comprise HTTP connection requests, which are substantially the same as packets transmitted from clients 106. In some embodiments of the invention, test units 110 periodically, for example every 5-10 test packet transmissions, download a file from servers 108 and measure the download time of the file from the servers.

In some embodiments of the invention, the one or more measured parameters include the round trip delay from when the test packet was transmitted until the response was completely received. Alternatively or additionally to measuring the response time to the test packets, test units 110 measure other communication related variables, such as jitter and/or throughput.

In some embodiments of the invention, the tests are performed every 0.1-0.5 seconds. Alternatively, the tests are performed at a higher rate, so that the communication information is always up-to-date. Further alternatively, the tests are performed at a lower rate, e.g., every hour, so that the tests do not substantially add to the load on servers 108 and/or network 100. In some embodiments of the invention, different tests are performed at different rates. Optionally, tests that require only slight amounts of resources (e.g., ping tests) are performed more often than tests that require large amounts of processing resources (e.g., file download tests).

In some embodiments of the invention, GSLB 102 manages a table 125 that lists, for each test unit 110, the most recent values of the one or more measured parameters, for each of servers 108. Alternatively or additionally, for one or more measured parameters, table 125 lists a weighted average value of the values recently received for the parameter.

Figure 2:
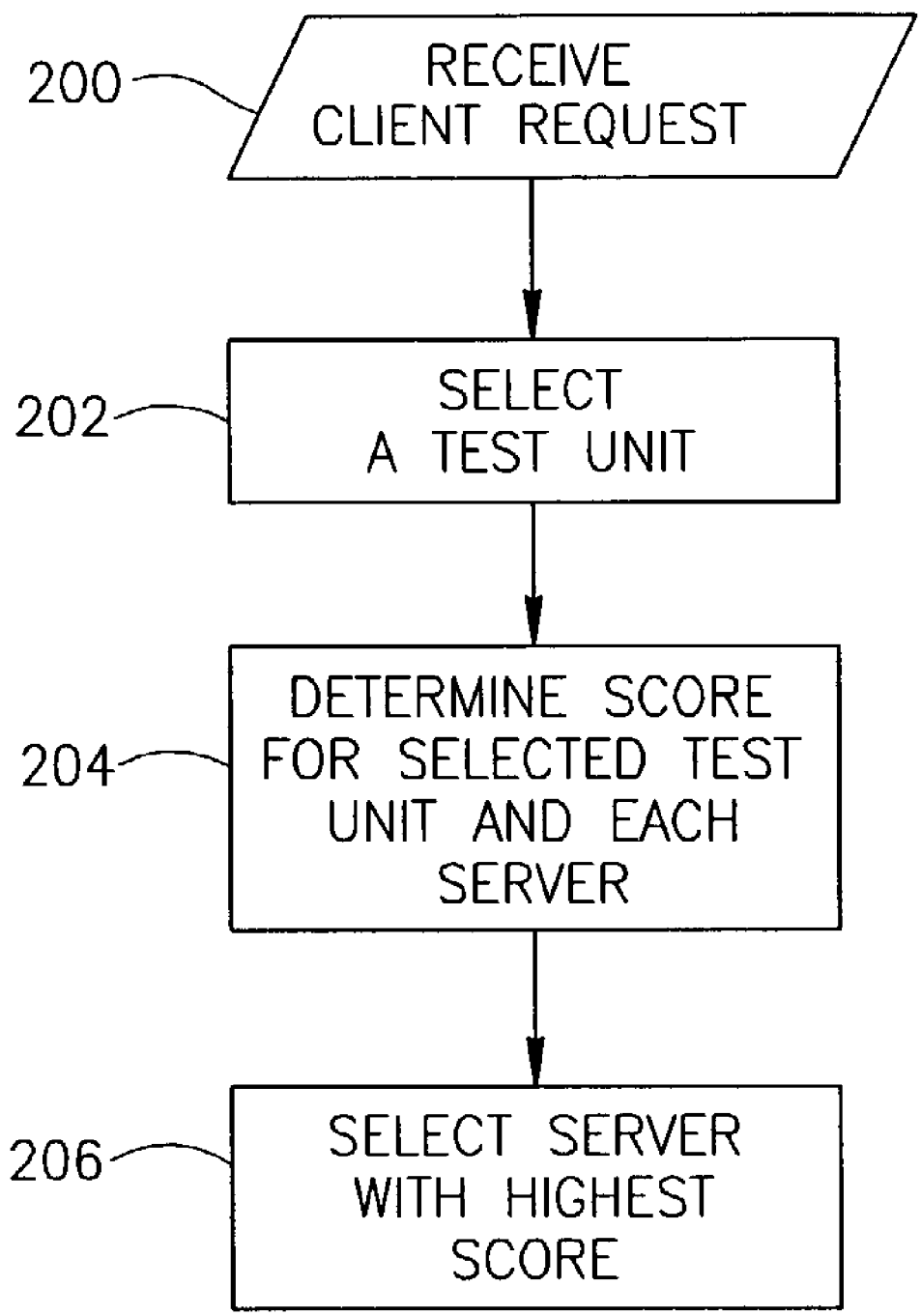
FIG. 2 is a flowchart of the acts performed by a global server load balancer responsive to receiving a client request, in accordance with an embodiment of the present invention.

FIG. 2 is a flowchart of acts performed by GSLB 102 responsive to receiving a client request, in accordance with an embodiment of the present invention. Upon receiving (200) a client request from a client 106, GSLB 102 selects (202) a test unit 110, whose tests best resemble the communication between the client 106 and servers 108. In some embodiments of the invention, GSLB 102 then determines (204) a score for the communication between the selected test unit 110 and each of the servers 108 hosting the site to which the client request pertains, based on data in table 125. The server 108 with a best score is selected (206) to service the client.

In some embodiments of the invention, the method of FIG. 2 is used only for clients 106 who were not recently serviced by the web site. In these embodiments, clients 106 recently receiving service for the web site from one of servers 108 are preferably directed to the same server 108.

Referring in more detail to selecting (202) a test unit 110, in some embodiments of the invention, a test unit 110 located closest to client 106 is selected. Optionally, the test unit 110 is selected according to the IP address of the client 106. Alternatively or additionally, the packet from the client 106 may state, for example in an options field of a header thereof, a geographical region of the client and/or an identity of a test unit to be used.

In some embodiments of the invention, the determined (204) score depends substantially only on parameter values determined by test units 110. Alternatively or additionally, the determined score depends on one or more attribute values determined independently from test units 110, in addition to one or more parameter values determined by test units 110. For example, the determined score may depend on load information received directly from servers 108, on load information managed by GSLB 102 and/or on static information (e.g., the distance between the client 106 and servers 108).

Referring in more detail to determining (204) a score for each of servers 108, for simplicity, a single function is used to determine the score from the parameters in table 125. Alternatively, determining the score includes selecting a function to be used in determining the score and applying the function to values in table 125. In some embodiments of the invention, the function is selected responsive to the identity of the client 106. For example, for clients 106 with a high priority or quality of service (QoS), GSLB 102 may use a more detailed function than for other clients. Alternatively or additionally, the selected function depends on the estimated distance between the client 106 and the selected test unit 110 and/or on the confidence of the estimation of the distance between the client 106 and the test unit 110. For example, when the client 106 is close to the selected test unit 110, with a high confidence, the function may depend mostly or entirely on the measurements from the selected test unit 110. If, however, the selected test unit is not close to the client 106, the selected function may give substantial weight (e.g., 50%) to values of one or more attributes independent of the location of the selected test unit 110 or having a low correlation to the location of test units 110.

The values of the one or more attributes independent of the location of test units 110 may be determined by test units 110, together with the other tests performed by test unit 110, or may be determined separately by other units, for example directly by GSLB 102. Alternatively or additionally, the values of the one or more attributes, independent of the location of test units 110, are received by GSLB 102 from servers 108 using any suitable protocol known in the art. The one or more attributes independent of the location of test units 110 (or having low correlation thereto) may include, for example, the load on servers 108 or any other load balancing attribute known in the art.

In some embodiments of the invention, the selected function depends on the web site accessed by the client 106, on the type of service the client requests to receive from the site and/or on the page through which the client accesses the site. For example, the site may be identified by a few different IP addresses which relate to different uses of the site and/or to different types of data expected to be downloaded from the site. GSLB 102 optionally consults the destination IP address in order to determine which function is to be selected. For example, more weight may be given to throughput and/or jitter when large amounts of data (e.g., audio and/or video) are expected to be downloaded by the client 106, while more weight is given to response time when short and fast responses are expected by the client.

As described above, in some embodiments of the invention, the application of the function to the parameter values in table 125 is performed after the client request is received. In some embodiments of the invention, however, the application of the score function is performed by GSLB 102 periodically and/or responsive to receiving updated values of the one or more parameters, and the determined score is stored in table 125 and/or in a separate score table. These embodiments may be used when a single function is used for substantially all client requests and/or when a plurality of different functions are used for different client requests. Optionally, for each score function, the score table manages a column which indicates the score based on the function for each server 108 and test unit 110. In an exemplary one of these embodiments, when a client request is received (200), a test unit 110 is optionally selected and a row of the selected unit in the score table is searched to find a server 108 column with a best score.

In some embodiments of the invention, GSLB 102 selects, periodically and/or responsive to receiving updated values of the one or more parameters, for each test unit 110 a server 108 having a best score. The selected server 108 having the best score is optionally indicated in a column of table 125 and/or in the score table. Optionally, a plurality columns indicating selected servers 108, for each score function which may be used, are included in the table. In these embodiments, when a client request is received (200), a test unit 110 and optionally a score function are selected, and accordingly, the score table (or table 125) are accessed to determine which server 108 is to be used. Thus, the delay caused by selecting server 108 is minimal (even negligible). If a single score function is used for all client requests, the determination is even simpler.

In some embodiments of the invention, GSLB 102 comprises a hardware unit (i.e., a unit which does not run software), which performs the selection of server 108 based on the contents of the score table or table 125. Optionally, the updating of the score table and/or of table 125 is performed by a software unit of GSLB 102. Thus, the tasks performed after receiving the request are performed by a fast hardware unit and the other tasks are performed by a software unit that allows simple application of complex methods. Alternatively, GSLB 102 is implemented entirely in hardware, so as to achieve fast operation, even if requiring use of simple methods or complex hardware. Further alternatively, GSLB 102 is implemented entirely in software.

Alternatively to storing the parameter values in table 125 of GSLB 102, the parameter values are managed by central testing unit 120, which provides GSLB 102 only with information it requires for selecting servers 108. In an exemplary embodiment of the invention, central testing unit 120 transmits to GSLB 102 for each test unit 110, a server 108 which should be used for clients in the vicinity of the test unit. In other embodiments of the invention, for example in which different functions of the parameters are used for different clients, central testing unit 120 transmits to GSLB 102 the measured parameters for each of test units 110. In still other embodiments of the invention, upon receiving a connection request from a client, GSLB 102 transmits a query to central testing unit 120 which selects a server 108 and transmits the identity of the selected server 108 to GSLB 102.

In some embodiments of the invention, test units 110 provide other functions, in addition to providing on-line communication data to GSLB 102, for example providing offline communication analysis data.

In some embodiments of the invention, test units 110 provide information to a plurality of different GSLBs 102. Optionally, different sets of test units 110 provide test results to different GSLBs 102. Optionally, the provider of test units 110 offers GSLB 102 owners different test packages which differ in the number of test units 110 which perform the tests and/or in the geographical distribution of the test units 110. In some embodiments of the invention, all of test units 110 perform the same tests at the same rates. Alternatively, different test units 110 perform their tests at different rates. For example, test units 110 located in areas from which large numbers of users access the web site of GSLB 102 may perform their tests more often than other test units 110.

In some embodiments of the invention, as described above, each test unit 110 tests the communications to each of servers 108. In other embodiments of the invention, one or more of test units 110 test the communications only to a sub-group of servers 108, for example servers located close to the test unit 110. Alternatively or additionally, one or more of test units 110 perform the tests for different servers 108 at different rates. For example, servers 108 that have only a low chance of being selected by clients 106 adjacent a specific test unit 110 may be tested at lower rates than other servers 108.

It is noted that a single GSLB 102 may represent a plurality of web sites that are hosted by the same servers 108 or by different, overlapping or non-overlapping, groups of servers 108. Test units 110 may perform the same tests for all the web sites represented by GSLB 102 or may perform different tests and/or at different rates for each of the web sites.

It is noted that although the above description relates to accessing web sites, the present invention is not limited to accessing web sites or to any specific protocol. The use of a GSLB in accordance with the present invention may be advantageous, for example, for HTTP, FTP, HTTPS protocols, as well as other protocols and to access of other virtual servers than web servers, such as FTP servers.

It will be appreciated that the above described methods may be varied in many ways, including, changing the order of steps, and/or performing a plurality of steps concurrently. It should also be appreciated that the above described description of methods and apparatus are to be interpreted as including apparatus for carrying out the methods and methods of using the apparatus.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

The invention claimed is:

1. A method of selecting, by a global server load balancer (GSLB), a server to represent a virtual server hosted by a plurality of servers, comprising:

receiving, by the GSLB, values of one or more communication parameters of paths between at least one test unit and at least two servers from the plurality of servers;

receiving, by the GSLB, a request to establish a connection with the virtual server from a client;

selecting, by the GSLB, a test unit from the at least one test unit to represent the client, responsive to the request from the client, the test unit being selected after the request from the client is received by the GSLB; and selecting, by the GSLB one of the plurality of servers to represent the virtual server before the client, responsive to the values of the one or more parameters for paths between the selected test unit and the at least two servers;

wherein test packets are transmitted from the at least one test unit to the at least two of the plurality of servers, responses to the test packets are received in the at least one test unit from the at least two servers, and the values of the one or more parameters are determined in the at least one test unit based on the received responses to the test packets.

2. A method according to claim 1, wherein receiving values of the one or more parameters comprises receiving periodically.

3. A method according to claim 2, wherein receiving values of the one or more parameters comprises receiving at least once an hour.

4. A method according to claim 1, wherein receiving values of the one or more parameters comprises receiving the values in packets transmitted from the test units.

5. A method according to claim 1, wherein the test packets comprise ping packets.

6. A method according to claim 1, wherein the test packets comprise data retrieval requests.

7. A method according to claim 1, wherein the one or more parameters comprise a round trip delay.

8. A method according to claim 1, wherein the one or more parameters comprise a throughput.

9. A method according to claim 1, wherein the one or more parameters comprise a jitter.

10. A method according to claim 1, wherein selecting a test unit comprises selecting a test unit closest to the client.

11. A method according to claim 1, wherein selecting a test unit comprises selecting responsive to the IP address of the client.

12. A method according to claim 1, wherein selecting one of the plurality of servers comprises selecting a server with a best value of a function of the one or more parameters for the path between the selected test unit and the servers.

13. A method according to claim 1, wherein selecting one of the plurality of servers comprises choosing a score function to apply to the one or more parameters associated with the different servers and selecting the server with a best score for the chosen function.

14. A method according to claim 13, wherein choosing the score function comprises choosing responsive to the client identity.

15. A method according to claim 13, wherein choosing the score function comprises choosing a function which depends substantially only on the one or more parameters.

16. A method according to claim 13, wherein choosing the score function comprises choosing a function which depends on at least one attribute not determined by the test units.

17. A method according to claim 1, wherein the at least one test unit comprises a plurality of test units.

18. A method according to claim 1, wherein the values of the one or more communication parameters used in selecting one of the plurality of servers to represent the virtual server before the client are received before the request to establish a connection from the client.

* * * * *